US007966620B2

(12) United States Patent
Mundkur et al.

(10) Patent No.: US 7,966,620 B2
(45) Date of Patent: Jun. 21, 2011

(54) SECURE NETWORK OPTIMIZATIONS WHEN RECEIVING DATA DIRECTLY IN A VIRTUAL MACHINE'S MEMORY ADDRESS SPACE

(75) Inventors: Sambhrama Madhusudhan Mundkur, Sammamish, WA (US); Alireza Dabagh, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 365 days.

(21) Appl. No.: 12/267,444

(22) Filed: Nov. 7, 2008

(65) Prior Publication Data

US 2010/0118868 A1    May 13, 2010

(51) Int. Cl.
*G06F 13/00* (2006.01)
(52) U.S. Cl. .............................. 719/319; 719/327; 718/1
(58) Field of Classification Search .................. 719/319, 719/327; 718/1
See application file for complete search history.

(56) References Cited

U.S. PATENT DOCUMENTS

| 6,041,058 A | 3/2000 | Flanders et al. |
| 6,570,884 B1 | 5/2003 | Connery et al. |
| 6,633,835 B1 | 10/2003 | Moran et al. |
| 6,892,287 B1 | 5/2005 | Millard et al. |
| 7,411,957 B2 | 8/2008 | Stacy et al. |
| 7,421,533 B2 | 9/2008 | Zimmer et al. |
| 7,721,299 B2* | 5/2010 | van Riel ......................... 719/319 |
| 7,801,046 B2* | 9/2010 | Persson et al. ................. 370/235 |
| 2008/0240140 A1 | 10/2008 | Dabagh et al. |
| 2010/0299459 A1* | 11/2010 | Tripathi et al. ................. 710/36 |

OTHER PUBLICATIONS

"BladeCenter Networking," *IBM Journal of Research and Development*, 2005, 20 pages.
"Generic Packet Classifer," Software Release 2.7.1, downloaded 2008, Ch. 5, p. 5-5-20.
"VLAN Leakage," Spirent Communications, 2007, 34 pages.

* cited by examiner

*Primary Examiner* — Andy Ho
(74) *Attorney, Agent, or Firm* — Woodcock Washburn LLP

(57) ABSTRACT

Techniques are disclosed for increasing the security of a system where incoming network packets are directly placed into the memory space of a virtual machine (VM) operating system (OS) running on the system via direct memory access (DMA). In an embodiment, each packet is split into a first portion, which requires further processing, and a second portion, which may be immediately placed into the VM OS's memory address space. When the host OS running on the system completes processing the first portion, it places it directly before the second portion in the VM OS memory space and indicates to the VM OS that a packet is available. Techniques are further disclosed that mitigate the security risk in such systems related to VLAN ID configuration.

20 Claims, 4 Drawing Sheets

SECURE NETWORK OPTIMIZATIONS WHEN RECEIVING DATA DIRECTLY IN A VIRTUAL MACHINE'S MEMORY ADDRESS SPACE

BACKGROUND

Virtualization provides techniques for consolidating physical machines. That is, multiple virtual machines can be executed by a single physical machine.

Virtual machine queue (VMQ) technology enables a receive queue on a VMQ capable hardware network interface card (NIC) to be dedicated to a NIC running in the Virtual Machine (VM). Filters for the media access control (MAC) address of the VM's NIC are configured on the hardware NIC to ensure that the NIC can filter traffic for that VM and indicate it to the virtual switch driver running in the host partition in a virtualized environment. Moreover, the common buffer that is used for the hardware NIC's receive buffers is allocated from the VM's memory address space. As a result, the hardware NIC uses direct media access (DMA) to place all incoming frames targeted to the VM's NIC directly to the VM memory. This avoids a copy from the host's memory to the VM's memory that would be necessary in the absence of VMQ.

However, enabling VMQ makes certain security attacks possible by a malicious VM. Without VMQ, the receive descriptors for the hardware NIC are allocated from the host partition's memory itself. As a result, the hardware NIC DMAs the incoming frames into host memory and indicates the network packets to the virtual switch driver running in the host partition. The virtual switch driver determines the target NIC in the VM and copies the packet data into the VM's memory to be consumed by the VM's networking stack. In the case of VMQ, since the frames are directly being DMAed to the VM's memory, the virtual switch driver does not incur the cost of copying the frame and just indicates the packets to the VM's networking stack. As the incoming frames are directly DMAed to the VM's memory, the VM has access to this frame even before virtual switch driver indicates the packet to the VM's networking stack. As a result, a malicious VM could modify the packet contents such that it adversely affects the components in the host partition or even services running in other VMs on the same physical host. This is a significant security risk and can be exploited by a malicious VM. For instance, the switch driver running in the host partition could look at the source MAC address in the incoming packet and update its internal state regarding the port on which this MAC is reachable. A malicious VM could tamper this field in the packet causing all packets destined to another VM to be transmitted through the hardware port, thus launching a denial of service (DoS) attack. Other components such as firewall filtering components might exist in the host that parses the packet even deeper. Therefore, there is a need to protect the fields in the incoming frames that are parsed by any component in the host partition from being modified by a malicious VM.

There is a further security risk associated with virtual local area network identifiers (VLAN IDs). Since the hardware filters incoming network packets based on the VM NIC's media access control (MAC) address, if a VLAN ID is configured on the VM NIC, a VM could monitor all traffic sent to its MAC address but on a different VLAN.

Therefore, it is desirable to have techniques that allow for direct memory access of network communications into a VM's address space, but limit the security risks associated with that.

SUMMARY

An embodiment of the present invention comprises a computing system running a host operating system (OS) and a VM OS. The system receives a network packet at a NIC, and divides that packet into two portions. The first portion comprises the part of the packet that requires further processing by the host OS before it may be sent to the VM OS, and the second portion comprises the part of the packet that may be immediately placed inside the memory space of the VM OS. The NIC places first portion of the packet into the memory of the host OS by a direct memory access (DMA), places the second portion of the packet into the memory of the VM OS by a direct memory access, and the host OS processes the first portion of the packet. When processed, the host OS copies the first portion of the packet to the memory of the VM OS and indicates to the networking stack of the VM OS that a packet is available.

Systems, methods, and computer readable storage media that perform the above and similar processes are disclosed.

It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION

Figure 1:
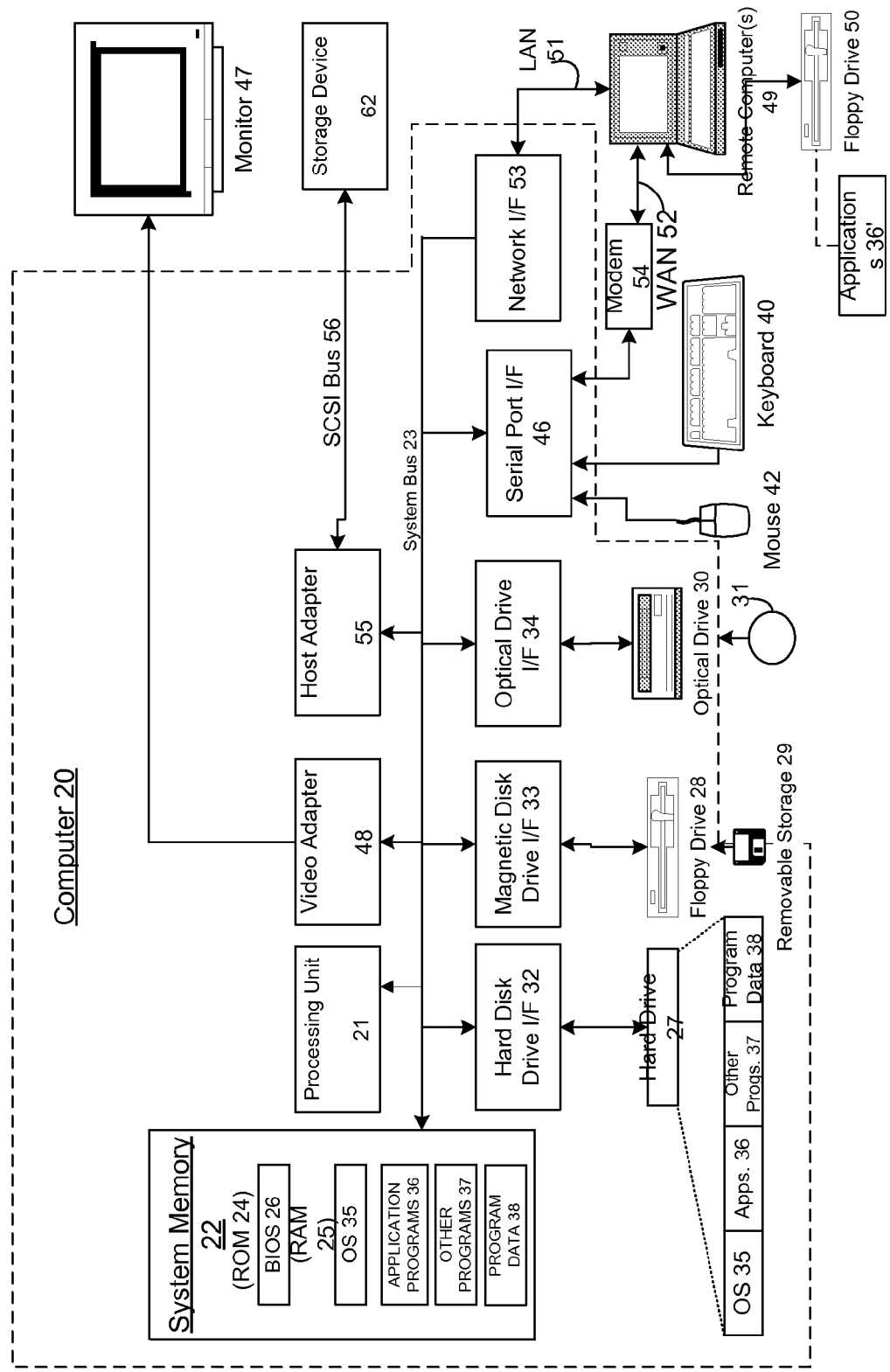
FIG. 1 depicts an example computer system wherein aspects of the present disclosure can be implemented.

Embodiments of the present disclosure may execute on one or more computers. FIG. 1 and the following discussion are intended to provide a brief general description of a suitable computing environment in which the disclosure may be implemented. One skilled in the art can appreciate that some or all of the components of the computer system of FIG. 1 can be used to effectuate the computers of FIGS. 3 and 4.

The term circuitry used through the disclosure can include specialized hardware components such as hardware interrupt controllers, hard drives, network adaptors, graphics processors, and audio codecs for example. In the same or other embodiments circuitry can include microprocessors configured to perform function(s) by firmware or by set switches. In the same or other example embodiments circuitry can include one or more logical processors, e.g., one or more cores of a multi-core general processing unit. The logical processor(s) in this example can be configured by software instructions embodying logic operable to perform function(s) that are loaded from memory, e.g., RAM, ROM, firmware, and/or virtual memory. In example embodiments where circuitry includes a combination of hardware and software an implementer may write source code embodying logic that is subsequently compiled into machine readable code that can be processed by the logical processor. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Referring now to FIG. 1, an exemplary general purpose computing system is depicted. The general purpose computing system can include a conventional computer 20 or the like, including a general purpose processing unit 21 that can include one or more logical processors, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments computer executable instructions embodying aspects of the present disclosure may be stored in ROM 24, hard disk (not shown), RAM 25, removable magnetic disk 29, optical disk 31, and/or a cache of general purpose processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the general purpose processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Figure 2:
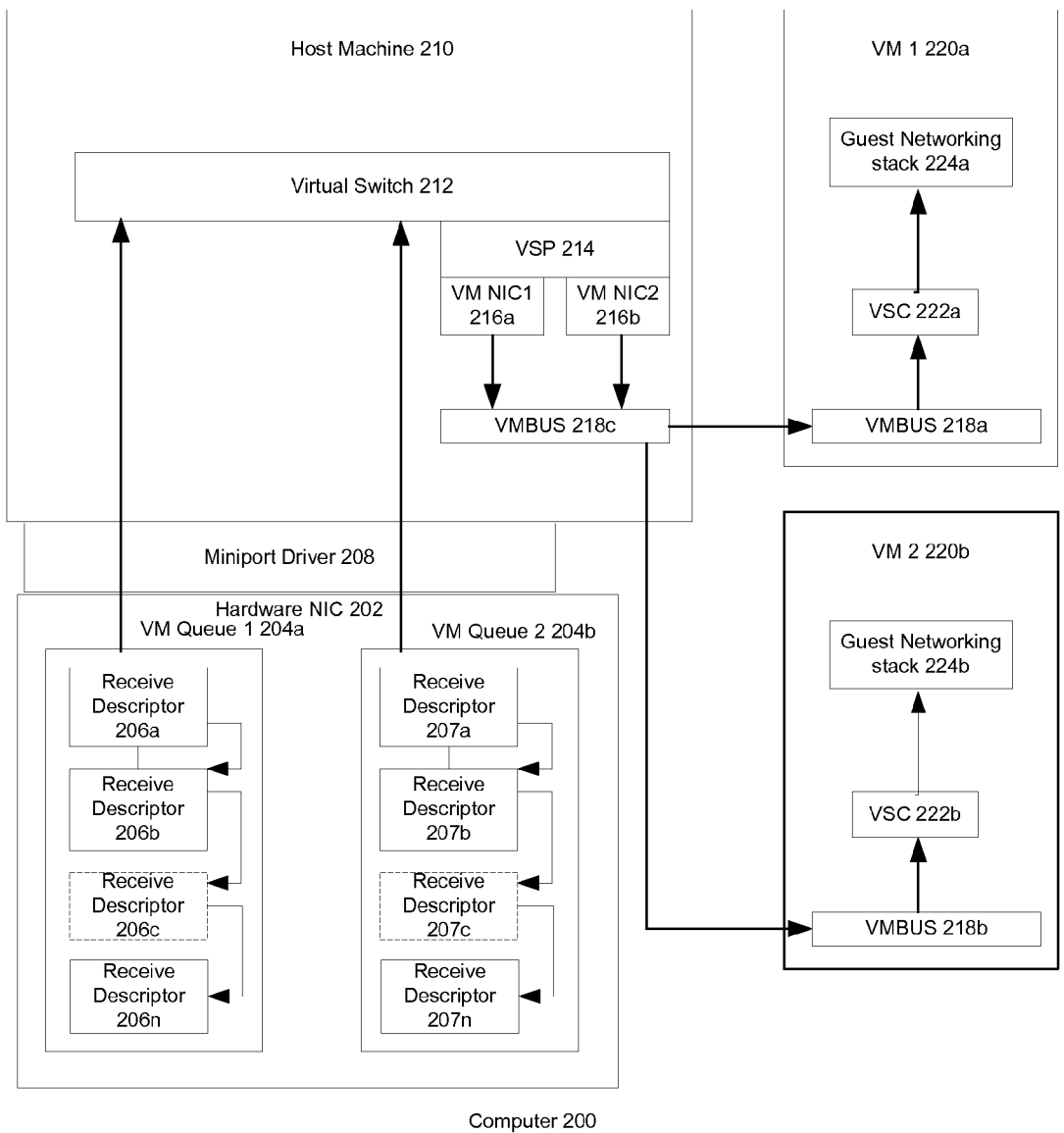
FIG. 2 depicts example operating procedures for the present disclosure.

FIG. 2 depicts an exemplary system that implements embodiments of the present disclosure.

The computing system 200 comprises a hardware NIC 208 connected to a host OS 210 via a miniport driver 208. In an embodiment, the miniport driver 208 is a software component that enables computer programs to interact with a hardware device. In this instance, the host OS 210 is such a software component and the NIC is such a hardware device. Additionally, two virtual machines 220 are running on the computing system 200 and connected to the host OS 210 via a VM bus 218.

Network communications are received by the computing system 200 at the NIC 202. In an embodiment, the NIC comprises computer hardware that enables computers to send and receive network communications across a computer network. When a packet is received, the NIC 202 determines which VM OS the packet is destined for. In an embodiment, this comprises reading the packet to determine a destination IP address that corresponds to an IP address of a particular VM OS.

In an embodiment, each received packet is placed in a VM queue corresponding to the VM OS that the packet is destined for. The VM queue comprises a linked list of receive descriptors, where one receive descriptor corresponds to one received network packet, and the first packet added to the queue is the first packet removed from the queue.

When the NIC has received a packet, it divides it into a first portion and a second portion. The first portion comprises that which must be analyzed by the host OS before the VM may have it, for instance, because a malicious VM OS could alter the portion's contents before it was properly analyzed by the host OS. The second portion comprises that which the VM OS may immediately have. In an embodiment, the first portion is determined to be a fixed number of bytes from the front of each received packet and the second portion is the remainder of the packet.

The NIC uses a direct memory access (DMA) command to place the first portion in the memory space of the host OS 210 and a DMA to place the second portion in the memory space of the corresponding VM OS 220. A DMA allows a hardware subsystem within a computer to read from or write to system memory independently of the central processing unit (CPU) of the computer. Such a means of data transfer reduces CPU overhead and increases throughput of data transfer. In this case, the NIC is such a hardware subsystem and the memory space of the host OS and the memory space of the VM OS are system memory. Where memory must be allocated in either the host OS or VM OS to store each portion, the host OS allocates memory in the host OS itself for the first portion or requests the VM to allocate memory for the second portion. This interface between the host and the VM allows for allocation and release of memory from the VM's memory address space on demand. In an embodiment, each memory allocation for the second portion has a "backfill"—an allocated portion immediately preceding where the second portion goes that fits the first portion, so the first portion and second portion may later be rejoined in the memory space of the VM OS.

The NIC also stores a receive descriptor for the packet in the VM queue corresponding to the VM that the packet is destined for. The receive descriptor comprises an indication of the first portion stored in the memory space of the host OS and an indication of the second portion stored in the memory space of the VM OS.

The NIC sends the host OS an indication that the packet has been received to a virtual switch driver 212 running on the host OS. In an embodiment, the virtual switch driver is a software platform that provides networking services to multiple operating systems running on a host computer simultaneously.

The host OS 210 also processes the first portion of the packet. In an embodiment this occurs only where the hardware NIC is unable to filter the packet based on the packet's MAC address and VLAN ID. If it can filter with both, there is no need for VLAN ID filtering on the host. In an embodiment, where the combination of MAC and VLAN ID filtering is not available on the hardware NIC, the packet is not DMA'ed into the VM OS's memory address space, and instead it is copied to the host OS entirely, which then copies it to the VM OS when it has processed the packet. This is because, if VLAN filtering cannot be achieved by the NIC, the NIC will indicate packets to the host OS that match the MAC address of the VM OS, but not necessarily the VLAN ID of the VM OS. If the data portion of a packet in this scenario were DMA'ed into the VM OS's memory, before the host OS can do VLAN ID filtering in software and drop the packet, the VM OS had had a chance to look at the second (data) portion of the packet because it is in the VM OS's memory, and for reasons discussed supra, that is a security risk.

In an embodiment, the lookahead-split size is 14 bytes, which comprises the Ethernet header of the packet, and processing is performed in the following manner. The virtual switch driver does MAC address learning based on the source MAC address in the packet in order to determine which MAC addresses are reachable by a given port or NIC. For each packet that is routed to the virtual switch driver (either through the hardware NIC or an internal VM NIC), the virtual switch driver examines the source MAC address in the packet and updates an internal routing or learning table. Later when a packet has to be transmitted, for example by a VM NIC, that packet is handed over to the routing module in the virtual switch driver. The routing module looks at the destination MAC address of the packet and the learning table to determine which port or NIC this packet should be sent to. If based on the routing table entries, the destination MAC address is reachable via another VM via a VM NIC or reachable via the physical NIC to the external network, the routing module routes the packet to the appropriate NIC.

If no destination port is determined, the packet is flooded, i.e., sent to all ports connected to the virtual switch. This is similar to the functioning of a physical switch.

With VMQ, one benefit is to avoid this cost of route lookup since the hardware NIC can determine the destination VM NIC based on the MAC and VLAN ID filter set in the hardware itself. So the virtual switch driver does not have to perform a route lookup and then determine which VM NIC the packet is destined for. However, the virtual switch driver may still need to examine the packets indicated via VMQ path to build the routing table. This is because all connected VM NICs may not have a VMQ allocated for it as the queues are a limited hardware resource.

In an embodiment where there are other firewall filters installed on the host OS, the host OS may perform processing in the form of deeper packet inspection, by looking at things such as the TCP port. In this embodiment, the lookahead-split size is set to a correspondingly larger size to capture the necessary information from the packet for the first portion. This is in order to make sure the entire portion of the packet that needs any kind of host OS processing is DMA'ed to the host OS's memory and not the VM OS's memory.

In an embodiment, the hardware NIC filters incoming packets based on the MAC address configured for a VM NIC and DMAs them directly to the VM's memory. However, if a VLAN ID is configured on the VM NIC, it should receive directed traffic belonging to the configured VLAN only. But if the virtual switch driver running on the host partition does the filtering based on the VLAN ID, a malicious VM can monitor the traffic sent to its MAC address but with a different VLAN ID. This opens up another security issue when VMQ is enabled. To mitigate this, the VLAN ID configured on the VM NIC is also configured on the hardware NIC along with the MAC address to use in filtering the incoming traffic to the VM. The hardware filters the incoming packets on both the MAC address and the VLAN ID and DMAs the packets to the VM's memory only when both the filters match. Thus, the VM is not allowed to see any traffic that is not destined for it.

The virtual switch driver 212 includes a virtualization service provider (VSP) 214 for networking, which is a software component that directly communicates with hardware drivers. It ensures that virtual machines can access the hardware successfully and that hardware access and sharing by multiple VMs is secure. The virtual switch driver also includes a VM NIC for each VM OS. In an embodiment, where there are a plurality of hardware NICs, the virtual switch drives includes a VM NIC for each hardware NIC exposed to the VM OS. A VM NIC is a software component that presents to a corresponding VM an interface identical to that of a hardware NIC. When it receives communications from the VM OS across the VMBus, it transmits those through the virtual switch to the hardware NIC.

The host OS also comprises a VMBus 218, which is a point-to-point in memory bus used by a VSP and a virtualization service client (VSC) 222 to cross-communicate. In the present embodiment, each VM NIC and the corresponding VSC for a virtual machine communicate through the VMBus. A VSC is a software component that runs in a VM OS and presents the virtualization device (here the corresponding VM NIC) to the VM OS.

Each VSC 222 in turn communicates with a corresponding guest networking stack 224, which is a software component implementation of a computer networking protocol suite.

When the host OS has finished processing the first portion it copies the first portion to the corresponding VM OS's memory space.

Figure 3:
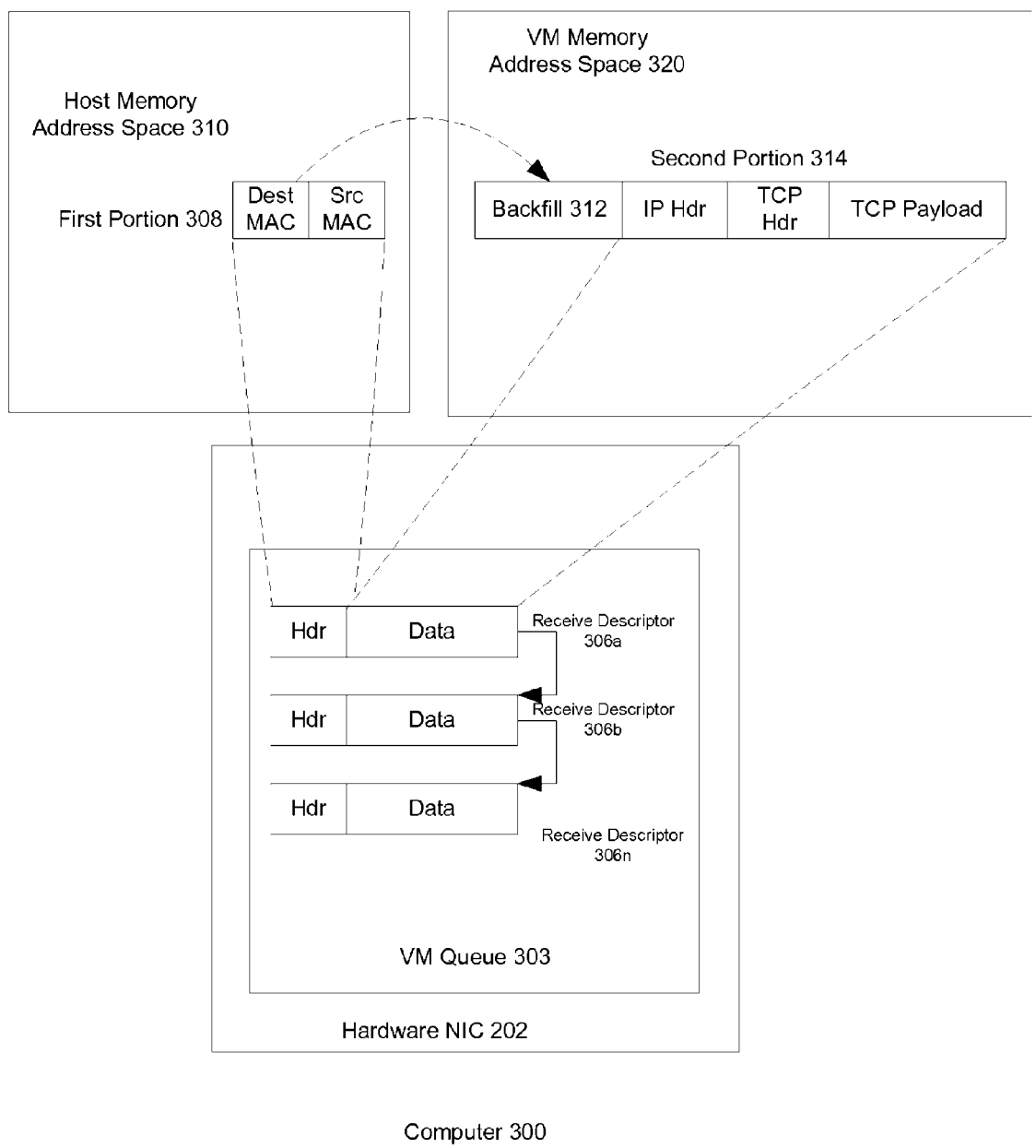
FIG. 3 depicts an example operating environment in which the teachings of the present disclosure may be practiced.

FIG. 3 depicts a subset of the system of FIG. 2, highlighting the storage locations and composition of received packets. This drawing depicts the embodiment where there is one VM OS running on the host OS, and the hardware NIC has a single VM queue corresponding to the one VM OS. When a packet is received by hardware NIC 202, it determines a first portion 308 and second portion 306. In an embodiment, the memory in the host OS memory address space is already allocated. It allocates VM OS memory address space 320 for the second portion 314. In an embodiment, there is a backfill 312 also allocated in the VM OS memory address space 320. This backfill comprises at least enough space to fit the first portion, so that after the host OS has processed the first portion, it may be copied into the backfill so that the packet is returned to its original form in contiguous memory.

In an embodiment, the first portion is written to the host OS address space via a DMA, and the second portion is copied to the VM address space via a DMA.

In an embodiment, the first portion comprises a destination MAC address—the MAC address of the system for which the packet is destined—and a source MAC address—the MAC address of the system from which the packet originated. In an embodiment, the second portion comprises an internet protocol (IP) header, a transmission control protocol (TCP) header and a TCP payload. In an embodiment the IP header is an internet protocol version 4 (TPv4) header, and in an embodiment the IP header is an internet protocol version 6 (TPv6) header. The IP header comprises information about the source and destination addresses at the IP communications level. The TCP header comprises information about the packet's destination and which routers on the network are to be used to transmit the packet to its destination. The TCP payload comprises the data that is to be transmitted to the destination.

The hardware NIC 202 also stores a reference to the packet in the form of a queue of receive descriptors. The host OS processes the first portion and when it has been processed, copies the first portion to the VM address space. In an embodiment, this is achieved by calling a software command (as opposed to a DMA) to transmit the first portion to the VM address space. In an embodiment where there is a backfill, the first portion is copied to the backfill such that the first portion and the second portion comprise a contiguous address space. In an embodiment, the backfill is the same size as the first portion, so that no excess memory is allocated for the packet.

Figure 4:
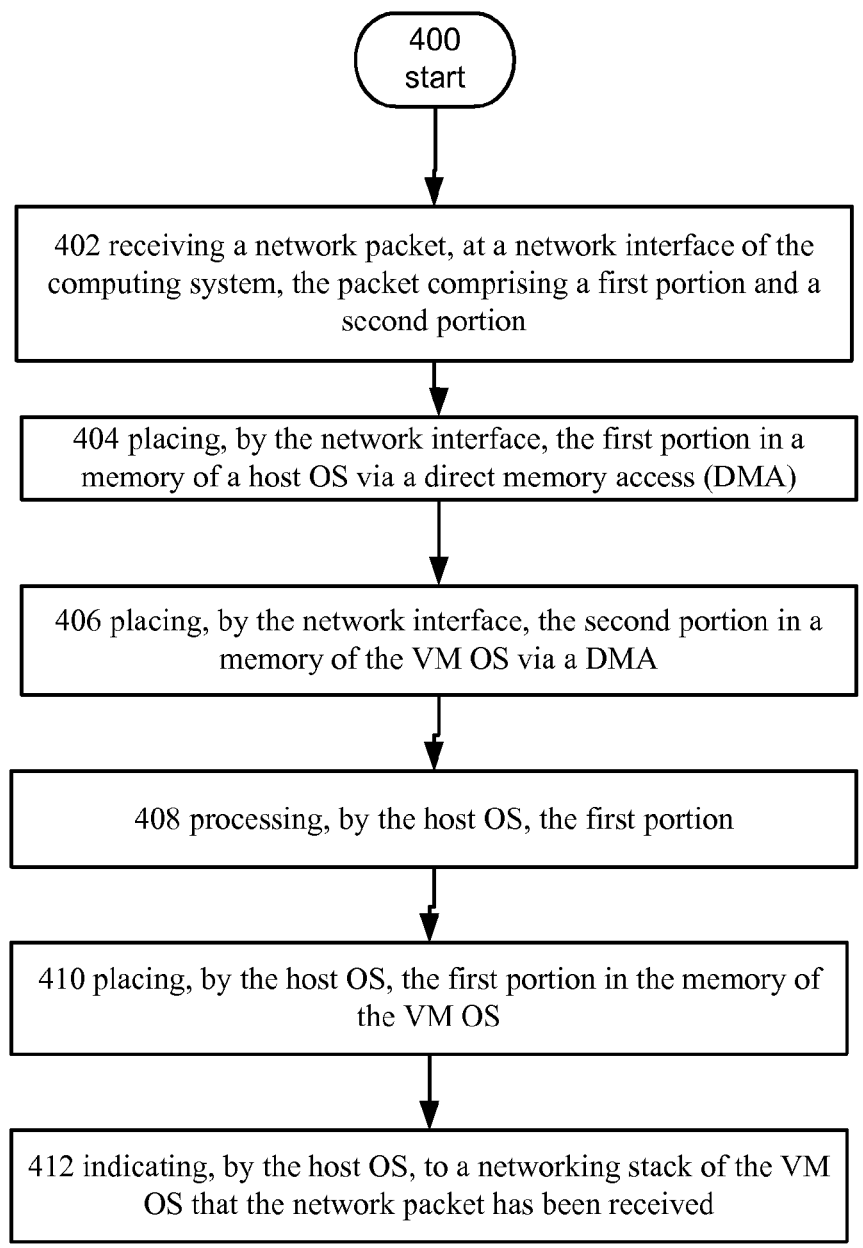
FIG. 4 depicts subset of the operating environment of FIG. 3 depicting an embodiment in greater detail.

FIG. 4 depicts an exemplary process flow that increases the security of network data placed directly into a VM's memory address space.

Operation 402 depicts receiving a network packet, at a network interface of the computing system, the packet comprising a first portion and a second portion.

In an embodiment, the network interface comprises a network interface card (NIC) and the packet is received across a communications network, such as an internet or an intranet, either via a wired or wireless communications channel. The first portion and the second portion may combine to form the entire packet. In an embodiment, the first portion is determined to be that part of the packet that requires further processing by a host operating system, and the second portion comprises the remainder of the packet, which may be immediately sent to the appropriate VM OS.

Operation 404 depicts placing, by the network interface, the first portion in a memory of a host OS via a direct memory access (DMA). A DMA allows a hardware subsystem within a computer to read from or write to system memory independently of the central processing unit (CPU) of the computer. Such a means of data transfer reduces CPU overhead and increases throughput of data transfer.

In an embodiment, the first portion has a size and the size of the first portion is determined according to a lookahead-split size of the packet. In this embodiment, the hardware network interface is configured for a given lookahead-split size, which is a number of bytes from the start to apportion to the first portion and which it applies to all incoming packets. Moreover, this "lookahead-split" size is configurable, so that based on the need of components running on the host partition the value can be configured to protect the appropriate parts of the incoming frames.

In an embodiment, the lookahead-split size is determined based on how deep the network packets are parsed.

In an embodiment, wherein the first portion is placed in an allocated memory of the memory of the host OS, the operation includes before placing the first portion in the memory of the host OS, receiving an indication that there is not space in the allocated memory for the first portion; and allocating at least enough memory to the allocated memory so that there is space in the allocated memory in the first portion.

When the NIC allocates a common buffer for its receive descriptors, based on the memory usage—whether the buffer will be used for the first portion or the second portion—the host OS determines whether to allocate the memory from the host or the VM memory address space. If the request is for the first portion of the incoming packets, the host OS allocates memory from the host memory address space itself. If the request is for the second portion of the incoming packets, the host OS requests that the VM allocate the memory from the VM's memory address space. This interface between the host and the VM allows for allocation and release of memory from the VM's memory address space on demand.

In an embodiment, first portion comprises a destination media access control (MAC) address and a source MAC address. In this case, the second portion comprises that part of the packet that is neither the destination MAC address nor the source MAC address.

If a VLAN ID is configured on the VM NIC, it should receive traffic belonging to the configured VLAN only. But if the virtual switch driver running on the host partition does the filtering based on the VLAN ID in software, a malicious VM can monitor the traffic sent to its MAC address but with a different VLAN ID. This opens up another security issue when VMQ is enabled. To mitigate this, the VLAN ID configured on the VM NIC is also configured on the hardware NIC along with the MAC address to use in filtering the incoming traffic to the VM. The hardware filters the incoming frames on both the MAC address and the VLAN ID and DMAs the frames to the VM's memory only when both the filters match. Thus, the VM is not allowed to see any traffic that is not destined for it.

Where there are multiple VM OSes, each VMQ configured for a NIC in the VM OS has a corresponding MAC address. The NIC classifies the packet based on the destination MAC address in the incoming packet and indicates it to the appropriate VMQ. If, in addition to the MAC address, a VLAN ID is configured for a VMQ, the NIC filters on both the MAC address and the VLAN ID and indicates only packets that match both of the fields in the incoming packets.

Operation 406 depicts placing, by the network interface, the second portion in a memory of the VM OS via a DMA. A DMA allows a hardware subsystem within a computer to read from or write to system memory independently of the central processing unit (CPU) of the computer. Such a means of data transfer reduces CPU overhead and increases throughput of data transfer.

In an embodiment wherein there are a plurality of VM OSes running on the computing system, placing the second portion includes determining, by the network interface, which VM OS of the plurality of VM OSes to place the second portion in a memory of based on a media access control (MAC) address in the network packet.

In an embodiment, the second portion comprises an internet protocol (IP) header, a transmission control protocol (TCP) header, and a TCP payload.

Operation 408 depicts processing, by the host OS, the first portion.

In an embodiment this occurs only where the hardware NIC is unable to filter the packet based on the packet's MAC address and VLAN ID. If it can filter with both, there is no need for VLAN ID filtering on the host. In an embodiment, where the combination of MAC and VLAN ID filtering is not available on the hardware NIC, the packet is not DMA'ed into the VM OS's memory address space, and instead it is copied to the host OS entirely, which then copies it to the VM OS when it has processed the packet. This is because, if VLAN filtering cannot be achieved by the NIC, the NIC will indicate packets to the host OS that match the MAC addresses of the VM OS, but not necessarily the VLAN ID of the VM OS. If the data portion of a packet in this scenario were DMA'ed into the VM OS's memory, before the host OS can do VLAN ID filtering in software and drop the packet, the VM OS had had a chance to look at the second (data) portion of the packet because it is in the VM OS's memory, and for reasons discussed supra, that is a security risk.

In an embodiment, the lookahead-split size is 14 bytes, which comprises the Ethernet header of the packet, and processing is performed in the following manner. The virtual switch driver does MAC address learning based on the source MAC address in the packet in order to determine which MAC addresses are reachable by a given port or NIC. For each packet that is routed to the virtual switch driver (either through the hardware NIC or an internal VM NIC), the virtual switch driver examines the source MAC address in the packet and updates an internal routing or learning table. Later when a packet has to be transmitted, for example by a VM NIC, that packet is handed over to the routing module in the virtual switch driver. The routing module looks at the destination MAC address of the packet and the learning table to determine which port or NIC this packet should be sent to. If based on the routing table entries, the destination MAC address is reachable via another VM via a VM NIC or reachable via the physical NIC to the external network, the routing module routes the packet to the appropriate NIC.

If no destination port is determined, the packet is flooded, i.e., sent to all ports connected to the virtual switch. This is similar to the functioning of a physical switch.

With VMQ, one benefit is to avoid this cost of route lookup since the hardware NIC can determine the destination VM NIC based on the MAC and VLAN ID filter set in the hardware itself. So the virtual switch driver does not have to perform a route lookup and then determine which VM NIC the packet is destined for. However, the virtual switch driver may still need to examine the packets indicated via VMQ path to build the routing table. This is because all connected VM NICs may not have a VMQ allocated for it as the queues are a limited hardware resource.

In an embodiment where there are other firewall filters installed on the host OS, the host OS may perform processing in the form of deeper packet inspection, by looking at things such as the TCP port. In this embodiment, the lookahead-split size is set to a correspondingly larger size to capture the necessary information from the packet for the first portion. This is in order to make sure the entire portion of the packet that needs any kind of host OS processing is DMA'ed to the host OS's memory and not the VM OS's memory.

Operation 410 depicts placing, by the host OS, the first portion in the memory of the VM OS.

In an embodiment, the operation of placing, by the host OS, the first portion in the memory of the VM OS is performed as a software operation. In this embodiment, an instruction is executed by the CPU to copy the memory over to the VM OS memory space, as opposed to copying it via DMA.

In an embodiment wherein placing, by the network interface, the second portion in a memory of the VM OS via a DMA comprises placing the second portion in the memory such that there is an amount of space immediately before it at least as large as a size of the first portion; and placing, by the host OS, the first portion in the memory of the VM OS comprises: placing the first portion in the portion of the memory of the VM OS immediately before the second portion.

That amount of space before the second portion may be referred to as the backfill. When the first portion is copied into the backfill, the VM OS then has the entire packet in contiguous memory, as if it were never subdivided in the first place.

Operation 412 depicts indicating, by the host OS, to a networking stack of the VM OS that the network packet has been received.

What is claimed:

1. A method for securing network packets that are placed directly into the address space of a virtual machine (VM) operating system (OS) running on a computing system with a host OS, comprising:

receiving a network packet, at a network interface of the computing system, the packet comprising a first portion and a second portion;

placing, by the network interface, the first portion in a memory of a host OS via a direct memory access (DMA);

placing, by the network interface, the second portion in a memory of the VM OS via a DMA;

processing, by the host OS, the first portion;

placing, by the host OS, the first portion in the memory of the VM OS; and indicating, by the host OS, to a networking stack of the VM OS that the network packet has been received.

2. The method of claim 1, wherein the first portion is determined according to a lookahead-split size of the packet.

3. The method of claim 2, wherein the lookahead-split size is determined based on how deep the network packets are parsed.

4. The method of claim 1, wherein placing, by the host OS, the first portion in the memory of the VM OS is performed as a software operation.

5. The method of claim 1, wherein the network interface comprises a network interface card (NIC).

6. The method of claim 1, wherein the first portion is placed in an allocated memory of the memory of the host OS, further comprising:

before placing the first portion in the memory of the host OS, receiving an indication that there is not space in the allocated memory for the first portion; and allocating at least enough memory to the allocated memory so that there is space in the allocated memory in the first portion.

7. The method of claim 1, wherein placing, by the network interface, the second portion in a memory of the VM OS via a DMA includes:

determining the VM OS in which to place the second portion based on a media access control (MAC) address of the packet.

8. The method of claim 7, wherein determining the VM OS in which to place the second portion based on a media access control (MAC) address of the packet includes:

determining the VM OS in which to place the second portion based on a virtual local area network interface (VLAN ID) of the packet.

9. The method of claim 1, wherein there are a plurality of VM OSes running on the computing system, further comprising:

determining, by the network interface, which VM OS of the plurality of VM OSes to place the second portion in a memory of based on a media access control (MAC) address and a virtual local area network identifier (VLAN ID) in the network packet.

10. The method of claim 1, wherein placing, by the network interface, the second portion in a memory of the VM OS via a DMA comprises: placing the second portion in the memory such that there is an amount of space immediately before it at least as large as a size of the first portion; and placing, by the host OS, the first portion in the memory of the VM OS comprises: placing the first portion in the portion of the memory of the VM OS immediately before the second portion.

11. The method of claim 1, wherein the first portion comprises a destination media access control (MAC) address and a source MAC address.

12. The method of claim 1, wherein the second portion comprises an internet protocol (IP) header, a transmission control protocol (TCP) header, and a TCP payload.

13. A system for securing network packets placed directly into the address space of a virtual machine (VM) operating system (OS) running on a computing system, comprising:

a processor;

a network interface that receives a packet, the packet comprising a first portion and a second portion, places the first portion in a memory of a host OS via a direct memory access (DMA), and places the second portion in a memory of the VM OS via a DMA; and a host OS that processes the first portion, places the processed first portion in the memory of the VM OS, and indicates to a networking stack of the VM OS that the network packet has been received.

14. The system of claim 13, wherein the host OS places the processed first portion via a software operation.

15. The system of claim 13, wherein the network interface comprises a network interface card (NIC).

16. The system of claim 13, wherein the network interface determines which VM OS of a plurality of VM OSes to send the second portion to based on at least one from a set, the set comprising: a media access control (MAC) address of the packet and a virtual local area network identification (VLAN ID) of the packet.

17. The system of claim 13, wherein the first portion comprises a destination media access control (MAC) address and a source MAC address.

18. The system of claim 13, wherein the second portion comprises an internet protocol (IP) header, a transmission control protocol (TCP) header, and a TCP payload.

19. The system of claim 13, wherein there are a plurality of VM OSes and the network interface determines which VM OS of the plurality of VM OSes to place the second portion in a memory of based on a media access control (MAC) address in the network packet.

20. A computer readable storage medium, comprising computer readable instructions that when executed on a computing system cause operations comprising:

receiving a network packet, at a network interface card (NIC) of the computing system, the packet comprising a first portion and a second portion, wherein the first portion comprises a destination media access control (MAC) address and a source MAC address, and the second portion comprises an internet protocol (IP) header, a transmission control protocol (TCP) header, and a TCP payload;

determining the first portion based on a lookahead-split size of the packet, wherein the lookahead-split size is determined based on how deep network packets are to be parsed;

allocating at least enough space in a memory of a host OS to store the first portion;

placing, by the NIC, the first portion in the allocated memory of the host OS via a direct memory access (DMA);

determining which VM OS of a plurality of VM OSes to place the second portion in a memory of based on a media access control (MAC) address, and a virtual local area network identifier (VLAN ID) of the network packet, allocating at least enough space in a memory of the VM OS to store the packet;

placing, by the network interface, the second portion in the allocated memory of the VM OS via a DMA, such that there is at least enough allocated space before the second portion to store the first portion;

processing, by the host OS, the first portion, wherein processing comprises determining a TCP port of the first portion, and performing MAC address learning based on the source MAC address of the first portion;

placing, by the host OS with a software operation, the first portion in the memory of the VM OS in the allocated memory of the VM OS directly before where the second portion is stored; and indicating, by the host OS, to a networking stack of the VM OS that the network packet has been received.

* * * * *